US007809607B2

(12) United States Patent
Gantman et al.

(10) Patent No.: US 7,809,607 B2
(45) Date of Patent: Oct. 5, 2010

(54) METHOD AND SYSTEM FOR PROVIDING REVERSE ONLINE AUCTION AND MOBILE COMMERCE

(75) Inventors: Alexander Gantman, Poway, CA (US); Jack Steenstra, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 667 days.

(21) Appl. No.: 11/045,952

(22) Filed: Jan. 28, 2005

(65) Prior Publication Data

US 2006/0173747 A1    Aug. 3, 2006

(51) Int. Cl.
*G06Q 30/00*    (2006.01)
(52) U.S. Cl. .......................................... 705/26; 705/27
(58) Field of Classification Search .................. 705/27, 705/26
See application file for complete search history.

(56) References Cited

U.S. PATENT DOCUMENTS

| | | | |
|---|---|---|---|
| 6,587,835 B1 * | 7/2003 | Treyz et al. .................... 705/14 |
| 7,024,376 B1 * | 4/2006 | Yuen ............................ 705/26 |
| 7,027,652 B1 * | 4/2006 | I'Anson ....................... 382/218 |
| 7,069,238 B2 * | 6/2006 | I'Anson et al. ................ 705/26 |
| 7,330,826 B1 * | 2/2008 | Porat et al. .................... 705/26 |
| 2002/0111870 A1 * | 8/2002 | Chinnappan et al. .......... 705/26 |
| 2003/0111531 A1 | 6/2003 | Williams |
| 2004/0138986 A1 * | 7/2004 | Petrovich ..................... 705/37 |

OTHER PUBLICATIONS

B&F: "Developers Rush to Provide User Friendly Applications fo GPRS," Business and Finance, Oct. 11, 2001; Dialog file 20 #19314197, 5pgs.*

* cited by examiner

*Primary Examiner*—Robert M. Pond
(74) *Attorney, Agent, or Firm*—Turocy & Watson, LLP

(57) ABSTRACT

A system for providing product pricing information is disclosed. The system includes a mobile client configured to allow a user to issue a request for pricing information on a specified product, a price research server configured to receive the request from the mobile client and generate pricing research results on the specified product in response to the request, the pricing research results including pricing information with respect to the specified product collected from one or more merchants, and a merchant server configured to receive the pricing research results and generate a response for delivery to the mobile client, the response including an offer.

40 Claims, 4 Drawing Sheets

METHOD AND SYSTEM FOR PROVIDING REVERSE ONLINE AUCTION AND MOBILE COMMERCE

FIELD

The present disclosure relates generally to mobile commerce, and more specifically, to methods and systems for providing reverse online purchase auctions and mobile commerce using mobile devices.

BACKGROUND

Some shoppers do their research on the products that they desire to purchase before they head to the stores. A number of websites are available to provide comparative pricing information on a large variety of products for such purposes. Once the shoppers obtain the desired pricing information, they may then head to the stores that offer the best pricing to make the purchases.

There is often a lag time between when the pricing research is performed and when the actual purchase takes place, especially where the purchase is to be completed physically at a store. For example, based on his/her research, a shopper may find out that a specific store offers the best price for a particular product, which is only available physically at that store. The shopper, however, may not have time to visit that store immediately. At a later time, the shopper may nonetheless continue to rely on the pricing information that s/he has obtained earlier, because the shopper may either forget or choose not to do farther research. As a result, the pricing information may not be the most recent and the shopper may miss out on certain savings opportunities.

In other situations, shoppers may decide to make purchases on a spontaneous basis when they are visiting the stores. When shopping at a store, comparative shopping of product prices is difficult to do in real-time.

Some stores have advertised lowest price guarantees where a purchaser may return a purchased item to the store for a refund or obtain a price difference rebate if the purchaser is able to find a better advertised price for the same item elsewhere. Even with such price guarantees, the purchaser would still have to deal with the inconvenience of returning the purchased item or claiming the rebate.

Hence, it would be desirable to provide methods and systems for providing reverse online auctions and mobile commerce using mobile devices.

SUMMARY

In one embodiment, a system for providing product pricing information includes a mobile client configured to allow a user to issue a request for pricing information on a specified product, a price research server configured to receive the request from the mobile client and generate pricing research results on the specified product in response to the request, the pricing research results including pricing information with respect to the specified product collected from one or more merchants, and a merchant server configured to receive the pricing research results and generate a response for delivery to the mobile client, the response including an offer.

In another embodiment, a system for providing product pricing information includes a mobile phone configured to derive product information with respect to a desired product and issue a request for pricing information on the desired product, the request including the product information, a price research server configured to perform pricing research on the desired product and generate pricing research results in response to the request, the pricing research results including pricing information on the desired product from a plurality of merchants, and a plurality of merchant servers, each merchant server configured to receive the pricing research results from the price research server and generate a response, the response including an offer.

In yet another embodiment, a mobile device usable to obtain product pricing information includes a processor configured to execute control logic, wherein the control logic is configured to allow a user to issue a request for pricing information on a desired product, receive a plurality of responses corresponding to respective merchants pursuant to the request, the plurality of responses including a plurality of offers with respect to the desired product or a plurality of alternative product offerings, display the plurality of responses to the user, and allow the user to select one of the plurality of responses.

In one aspect, a method for providing product pricing information includes directing a mobile device to issue a request for pricing information on a desired product, generating pricing research results on the desired product in response to the request, generating a plurality of responses based on the pricing research results, forwarding the plurality of responses to the mobile device, and directing the mobile device to display the plurality of responses for selection by a user.

In another aspect, a method for providing product pricing information includes directing a mobile phone to derive product information with respect to a desired product, issuing a request for pricing information on the desired product, the request including the product information, generating pricing research results on the desired product in response to the request, generating a plurality of responses based on the pricing research results, forwarding the plurality of responses to the mobile phone; and directing the mobile phone to display the plurality of responses for selection by a user.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
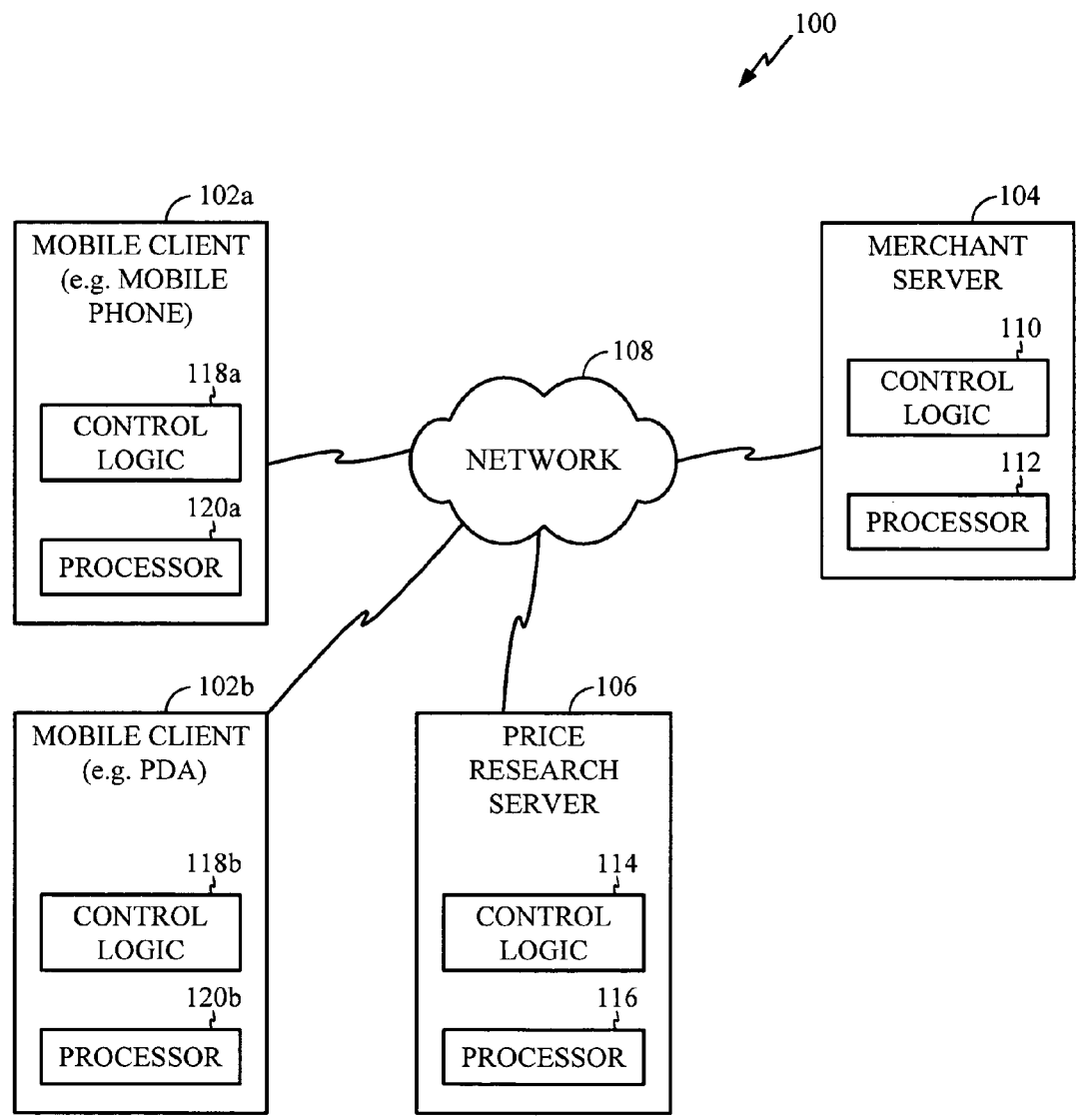
FIG. 1 is a simplified schematic diagram illustrating one embodiment of a price research and management system according to the present disclosure.

FIG. 1 illustrates a system 100 that may be used to provide price research and management according to the present disclosure. In one embodiment, the system 100 may include mobile clients 102a,b, a merchant server 104 and a price research server 106. The mobile clients 102a,b, the merchant server 104 and the price research server 106 may be interconnected by a network 108. The network 108 may include a computer network (such as, the Internet and other types of computer networks such as local area networks and wide area networks) or other types of communication networks (such as, a cellular network). It should be understood that the network 108 may be made up of a combination of different networks. For illustrative purposes herein, only a single network is shown.

Control logic implementing the system 100 is distributed to and resident on various components of the system 100 including, for example, control logic 118a,b residing on the mobile clients 102a,b, control logic 114 residing on the price research server 106 and control logic 110 residing on the merchant server 104, to collectively carry out the functionality and/or protocol of the system 100, as will be further described below. Respective processors 120a,b, 116 and 112 residing on the mobile clients 102a,b, the price research server 106 and the merchant server 104 are used to execute the control logic. For purposes of simplicity, other components in the system 100 that facilitate communications amongst the mobile clients 102a,b, the price research server 106 and the merchant server 108 are not shown.

The mobile clients 102a,b may be used by a user to communicate with the price research server 106 in order to allow the user to obtain pricing information with respect to a specified product, as will be further described below. Illustrative examples of the mobile clients 102a,b may include a mobile phone, a personal digital assistant (PDA) or other types of mobile communication devices that are capable of communicating with the price research server 106. The mobile clients 102a,b and the price research server 106 may communicate with each other via the network 108 in a number of ways. For example, the mobile clients 102a,b, the price research server 106 and the network 108 may be enabled to handle wireless communication technologies, such as, Ultra-Wide Band, Bluetooth, infrared, radio or any other wireless communication technologies.

Figure 2:
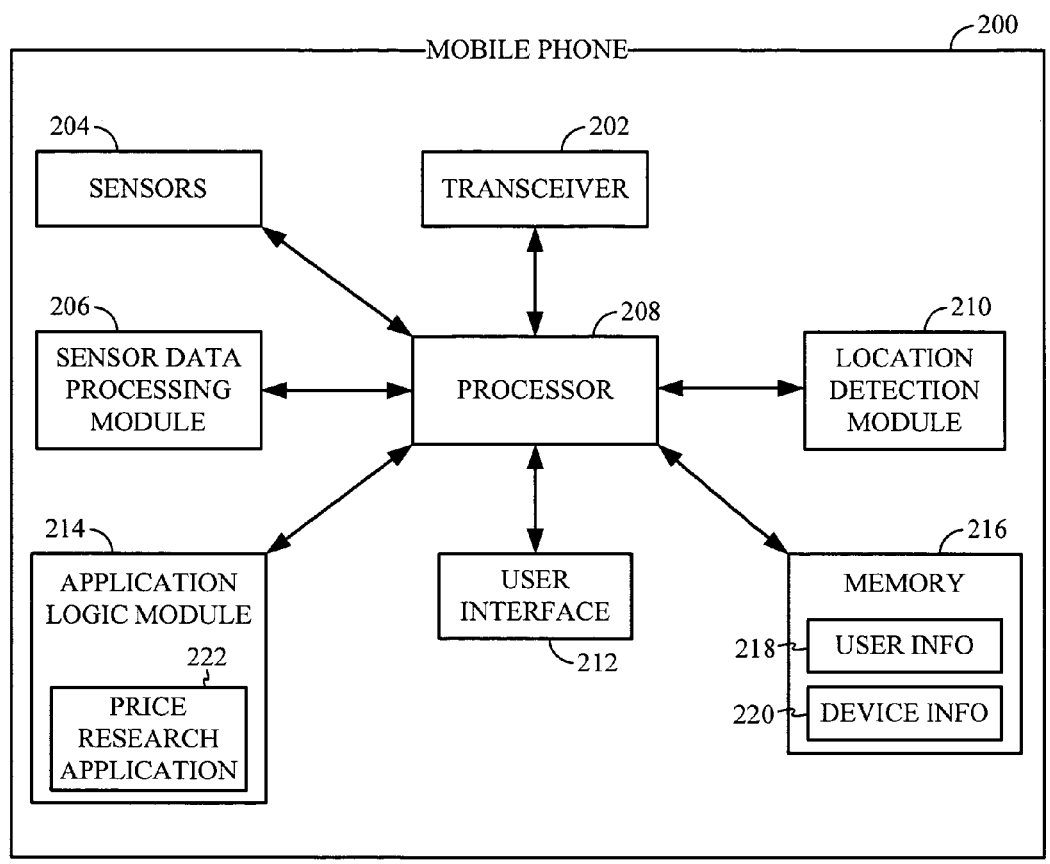
FIG. 2 is a simplified schematic diagram illustrating a mobile phone that can be used in the price research and management system according to the present disclosure.

As mentioned above, the mobile clients 102a,b may include a mobile phone. FIG. 2 illustrates a mobile phone 200 that may be used with the system 100. The mobile phone 200 may include a transceiver 202, sensors(s) 204, a sensor data processing module 206, a processor 208, a location detection module 210, a user interface 212, and an application logic module 214.

The transceiver 202 may be configured to transmit and receive signals to and from the mobile phone 200. The transceiver 202 may facilitate mobile phone communications with a base station (not shown) which may be part of the network 108. The transceiver 202 may provide various signals processing functions such as encoding and modulation. In the case of a CDMA (Code Division Multiple Access) phone, the transceiver 202 may also include spread spectrum processing.

The sensor(s) 204 may include a camera that is configured to capture video images or data. The sensor(s) 204 may also include a radio-frequency (RF) receiver configured to detect and capture RF identification information.

The sensor data processing module 206 may be configured to process the data captured by the sensor(s) 204. For example, the sensor data processing module 206 may include a pattern recognition application that is configured to accurately identify a barcode from the captured video images. In another example, the sensor data processing module 206 may be configured to process the captured RF identification information.

The user interface 212 may include, for example, a screen, a key pad or other input/output devices which allow a user of the mobile phone 200 to view certain information and provide input to the mobile phone 200.

The application logic module 214 may include various types of control logic that are configured to support corresponding applications. Such applications may include, for example, a price research application 222 that is configured to determine and manage pricing information on various products.

The location detection module 210 may be configured to determine where the mobile phone 200 is physically located. For example, the location detection module 210 may include a GPS (Global Positioning System) receiver that is configured to provide location information.

The memory 216 may be used to store various types of information including, for example, user information 218 and device information 220. Device information 220 may further include device ID, timestamp and location information.

The processor 208 may be configured to control operations of the mobile phone 200 by providing coordination amongst the various components mentioned above.

Figure 3A:
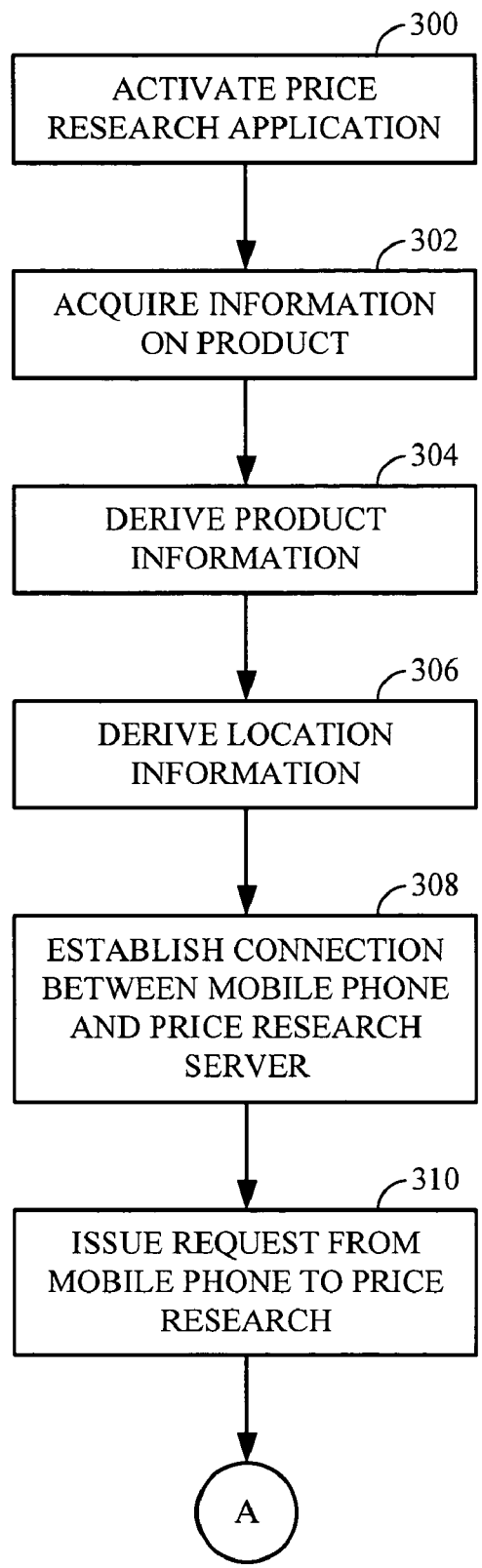
FIGS. 3A-3B are flow diagrams collectively illustrating the operational flow of the price research and management system according to the present disclosure.
Figure 3B:
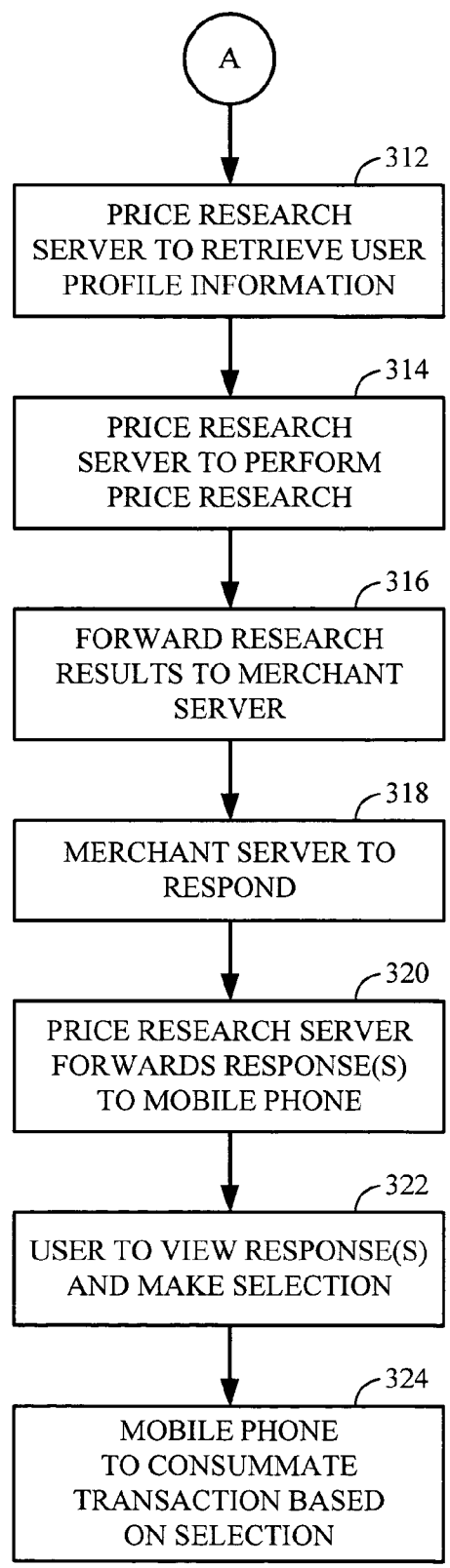

FIGS. 3A-3B collectively illustrate the operational flow of the system 100. In this example, it is presumed that the mobile client 102a is the mobile phone 200 as shown in FIG. 2. When a shopper is shopping at a store and wishes to obtain pricing information on a desired product, s/he may use the user interface 212 to select the price research application 222 that is resident on the mobile phone 200.

At block 300, upon detecting the selection made by the shopper, the processor 208 accordingly activates the price research application 222.

At block 302, upon activation of the price research application 222, the shopper may use the mobile phone 200 to acquire information on the desired product. For example, the shopper may use the sensor(s) 204 to capture video images of the barcode on the product; alternatively, if the product has a RFID tag, the shopper may use the sensor(s) 204 to capture the RFID information.

At block 304, the acquired information is processed by the sensor data processing module 206 to further derive the appropriate product information. For example, the sensor data processing module 206 may analyze the captured video images to identify the correct UPC barcode and further derive product information corresponding to the product. Similarly, the sensor data processing module 206 may analyze the captured RFID information to identify the corresponding product.

At block 306, the location detection module 210 may be used to acquire location information with respect to the mobile phone 200. For example, GPS information can be derived by the location detection module 210. In another configuration, the store where the shopper is physically located may include signal transmitters that are configured to transmit signals that can be identified by the location detection module 210. Such signals can be used by the location detection module 210 to identify the store and its physical location.

At block 308, the price research application 222 may also direct a connection to be established with the price research server 106. The connection is to be used for communications between the mobile phone 200 and the price research server 106.

It should be noted that the activities undertaken with respect to blocks 306 and 308 may be performed concurrently with or sequentially after those relating to blocks 302 and 304.

At block 310, the price research application 222 may issue a request to the price research server 106 for pricing information on a specified product. The request may include a variety of information including, for example, the derived product information, location information, user information and device information.

At block 312, the price research server 106 may retrieve user profile information relating to the shopper based on the user information provided by the mobile phone 200. The user profile information may include user preferences, historical information, etc. The user profile information may have been provided to the price research server 106 previously, for example, when the shopper first registered with the price research server 106. Some of the user profile information may also be derived by the price research server 106 based on prior activities of the shopper. For example, the shopper may have previously indicated that the s/he prefers to shop at certain preferred stores; the list of preferred stores can also be derived by the price research server 106 based on the prior activities of the shopper. Therefore, price research may be performed on these preferred stores first before any others. Alternatively, the shopper may also have previously excluded certain stores. Consequently, price research will not be performed on these excluded stores.

At block 314, using the information received from the mobile phone 200 and the user profile information, the price research server 106 then performs price research and comparisons on the specified product. For example, the price research server 106 may contact various websites having information on the specified product and retrieve the appropriate information. The price research server 106 may then analyze the retrieved information and generate research results. The research results may be in the form of a ranked or prioritized list listing the stores that have the specified product and their corresponding prices.

At block 316, the price research server 106 may forward some or all of the research results and other relevant product information to the merchant server 104. The merchant server 104 may be operated by the merchant whose store the shopper is currently visiting. It should be noted that the price research server 106 may also forward the research results to other merchant server(s) (not shown). Generally, the research results are forwarded to the merchant server 104 by the price research server 106 in situations where the merchant does not offer the best price on the specified product. By forwarding the research results to the merchant server 104, the merchant server 104 is given an opportunity to make an offer for the same product at a lower price or offer other alternative(s), if any, as will be further described below.

At block 318, upon receiving the research results and the relevant product information, the merchant server 104 may perform its own analysis and respond accordingly. For example, the merchant server 104 may conclude that it is not feasible to match or beat the best price offered on the specified product. Alternatively, the merchant server 104 may respond with an offer at a lower price or offer other alternative(s). Other alternative(s) include offering incentive(s) and/or similar product(s) at price(s) that might interest the shopper. Since the location of the mobile phone 200 is known to the merchant server 104, the merchant server 104 may further tailor its response based on current merchandise or inventory that is available at the store where the shopper is presently located. The response provided by the merchant server 104 may be in the form of an electronic coupon that can be redeemed or a hyperlink that corresponds to the offered product(s) at the merchant's website. The merchant server 104 then forwards its response to the price research server 106.

At block 320, the price research server 106 relays the response from the merchant server 104 to the mobile phone 200. As mentioned above, since the research results may be forwarded to multiple merchant server(s), the price research server 106 may receive multiple responses. Consequently, the mobile phone 200 may also receive multiple responses.

At block 322, the response(s) are displayed to the shopper for selection on the mobile phone 200 via the user interface 212. The shopper may then make the desired selection, if any; alternatively, the shopper may choose to not make any selection but instead use the response(s) as bargaining leverage to negotiate with the store where the shopper is currently situated.

At block 324, upon the shopper making the desired selection, the price research application 222 may then consummate the purchase transaction. For example, if the selection is in the form of an electronic coupon, the price research application 222 may redeem the coupon electronically at the point of purchase or checkout; alternatively, if the selection is in the form of a hyperlink, the price research application 222 may activate the hyperlink and connect to the corresponding website to consummate the purchase transaction online.

The system as described above according to the present disclosure can be deployed in various applications. For example, the system can be deployed in stores owned by various participating merchants. A shopper may use his/her mobile phone to request pricing information on a product at the point of sale or purchase to ensure that s/he is getting the best available price from various merchants. The foregoing is similar to a reverse auction where a buyer is obtaining the best available price. Based on the disclosure and teachings provided herein, a person of ordinary skill in the art will appreciate how to deploy the system in other applications.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the embodiments disclosed herein may be embodied directly in hardware, in a software module executable by a processor, or in a combination of both, in the form of control logic, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit of scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more". All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

What is claimed is:

1. A system for providing product pricing information, the system comprising:
   a mobile client configured to issue a request for pricing information on a specified product, the mobile client including a location module configured to ascertain a current location of the mobile client independent from a manual input, the request including the current location;
   at least one merchant server corresponding to a at least one merchant; and
   a price research server configured to receive the request from the mobile client and to generate pricing research results on the specified product in response to the request, the pricing research results including pricing information for the specified product collected from a plurality of merchants, the price research server further configured to send the pricing research results to a merchant server selected from the at least one merchant server and corresponding to a merchant identified by the current location,
   wherein the at least one merchant server is configured to receive the pricing research results and to generate a response based on the pricing research results for delivery to the mobile client, the response including an offer for the specified product, and wherein at least one of the pricing research results from a given merchant includes an offer for an alternative product as determined by the given merchant that it is not feasible to offer the specified product at a price lower than the best price offered for the specified product by at least one other merchant.

2. The system of claim 1 wherein the mobile client is further configured to derive product information relating to the specified product and to incorporate the product information into the request.

3. The system of claim 2 wherein the mobile client is configured to derive the product information by capturing and analyzing video images of the specified product, the video images including a barcode located on the specified product.

4. The system of claim 1 wherein the mobile client is further configured to include user information in the request; and wherein the price research server is further configured to retrieve user profile information based on the user information and to generate the pricing research results using the user profile information.

5. The system of claim 4 wherein the user profile information includes user preferences on merchants, the user preferences on merchants including at least one excluded merchant, wherein the pricing research results exclude pricing research results for the at least one excluded merchant.

6. The system of claim 1 wherein the mobile client is further configured to accept input selecting an offer from the response, the input initiating a purchase transaction with respect to the offer.

7. The system of claim 6 wherein the mobile client is further configured to complete the purchase transaction online.

8. The system of claim 1 wherein the price research server is further configured to forward the current location to the at least one merchant server; and wherein the at least one merchant server is further configured to generate the response based on the current location.

9. The system of claim 1 wherein the mobile client includes a mobile phone.

10. The system of claim 1 wherein the offer includes at least one of an electronic coupon, an alternative product offering, or a hyperlink corresponding to the specified product at a merchant website.

11. A system for providing product pricing information, the system comprising:
   a mobile phone configured to:
      derive product information with respect to a selected product;
      ascertain a current location of the mobile phone independent of user input; and
      issue a request for pricing information on the selected product, the request including the product information and the current location of the mobile phone;
   a price research server configured to perform pricing research on the selected product and to generate pricing research results in response to the request, the pricing research results including pricing information on the selected product from a plurality of merchants; and
   a plurality of merchant servers, each merchant server configured to receive the pricing research results from the price research server and to generate a response based on the pricing research result, the response including an offer for the selected product, wherein at least one of the plurality of responses from a given merchant server includes an offer for an alternative product as determined by the given merchant server that it is not feasible to offer the selected product lower than a best price offered for the selected product by at least one other merchant server, wherein the price research server is further configured to send the pricing research results to a selected merchant server from the plurality of merchant servers that corresponds to a store identified by the current location.

12. The system of claim 11 wherein the price research server is further configured to receive respective responses from the plurality of merchant servers and to forward the responses to the mobile phone for selection.

13. The system of claim 12 wherein the mobile phone is further configured to accept an input to make a selection from amongst the responses.

14. The system of claim 13 wherein the mobile phone is further configured to complete a purchase transaction with respect to the selected product in response to the selection.

15. The system of claim 14 wherein the mobile phone is further configured to complete the purchase transaction online.

16. The system of claim 11 wherein the mobile phone is further configured to derive the product information by capturing video images of the selected product and analyzing the captured video images to derive the product information, the video images including a barcode located on the desired product.

17. The system of claim 11 wherein the mobile phone is further configured to include user information in the request; and wherein the price research server is further configured to retrieve user profile information based on the user information and to generate the pricing research results using the user profile information.

18. The system of claim 17 wherein the user profile information includes user preferences on merchants.

19. The system of claim 11 wherein the price research server is further configured to forward the current location to the plurality of merchant servers; and wherein one or more of the plurality of merchant servers are further configured to generate their respective responses based on the current location.

20. The system of claim 11 wherein the selected merchant server generates an offer for the selected product that includes a price that has been adjusted based on the pricing research results forwarded by the price research server.

21. The system of claim 11 wherein the offer includes at least one of an electronic coupon, an alternative product offering, or a hyperlink corresponding to the selected product at a merchant website.

22. A mobile device usable to obtain product pricing information, the mobile device comprising:
a processor configured to execute control logic wherein the control logic is implemented as a set of computer-readable instructions stored in a computer-readable storage medium, the instructions configured to:
ascertain a current location of the mobile device independent of user input;
issue a request for pricing information on a selected product, the request including the current location of the mobile device, wherein the request is forwarded to a price research server that collects location-specific pricing research results on the selected product from a plurality of merchants and forwards the pricing research results to a merchant server corresponding to the current location of the mobile device, and wherein at least one of the pricing research results from a given merchant includes an offer for an alternative product as determined by the given merchant that it is not feasible to offer the selected product at a price lower than a best price offered for the selected product by at least one other pricing research result;
receive a plurality of offers for the selected product corresponding to the plurality of merchants pursuant to the request, the plurality of offers based on the pricing research results, wherein the plurality of offers includes an offer generated by the merchant server;
display the plurality of responses; and
allow selection of at least one of the plurality of responses.

23. The mobile device of claim 22 wherein the instructions are further configured to derive product information relating to the selected product and incorporate the product information into the request.

24. The mobile device of claim 23 wherein the instructions are further configured to acquire the product information by capturing and analyzing video images of the selected product, the video images including a barcode located on the selected product.

25. The mobile device of claim 22 wherein the instructions are further configured to include user information in the request; and
wherein at least one of the plurality of responses is generated based on user profile information corresponding to the user information.

26. The mobile device of claim 25 wherein the user profile information includes user preferences on merchants.

27. The mobile device of claim 22 wherein the instructions are further configured to complete a purchase transaction with respect to the selected product in response to the selection.

28. The mobile device of claim 27 wherein the offer generated by the merchant server includes a price adjusted by the merchant server based on the pricing research results.

29. A method for providing product pricing information, the method comprising:
employing a processor to execute computer-executable instructions stored on a computer-readable storage medium to implement the following acts:
ascertaining a current location of a mobile device the current location ascertained independent from a manual input;
directing the mobile device to issue a request for pricing information on a selected product, the request including the current location of the mobile device;
generating pricing research results on the selected product in response to the request and transmitting the pricing research results to a plurality of merchants offering the product;
receiving a plurality of responses from the plurality of merchants based on the pricing research results, wherein the plurality of responses include offers for the selected product, wherein at least one of the plurality of responses is generated based on the current location, and wherein at least one of the plurality of responses from a given merchant includes an offer for an alternative product as determined by the given merchant that it is not feasible to offer the selected product at a price lower than the best price offered for the selected product by at least one other response; and
forwarding the plurality of responses to the mobile device.

30. The method of claim 29 further comprising:
directing the mobile device to display the plurality of responses for selection; and
directing the mobile device to complete a purchase transaction with respect to the selected product upon selection of one of the plurality of responses.

31. The method of claim 30 further comprising completing the purchase transaction online.

32. The method of claim 29 further comprising:
 directing the mobile device to derive product information relating to the selected product; and
 directing the mobile device to incorporate the product information into the request.

33. The method of claim 29 further comprising:
 directing the mobile device to include user information in the request; and
 retrieving user profile information based on the user information;
 wherein the pricing research results are generated based on the user profile information.

34. A method for providing product pricing information, the method comprising:
 employing a processor to execute computer-executable instructions stored on a computer readable storage medium to implement the following acts:
  ascertaining a current location of the mobile independent from a manual input;
  directing the mobile phone to derive product information with respect to a selected product;
  issuing a request for pricing information on the selected product, the request including the product information and the location of the mobile phone;
  receiving pricing research results on the selected product from a plurality of merchants in response to the request, at least one of the pricing research results based on the current location;
  generating a plurality of responses based on the pricing research results, the responses including offers from the plurality of merchants for the selected product, wherein at least one of the plurality of responses from a given merchant includes an offer for an alternative product as determined by the given merchant that it is not feasible to offer the selected product at a price lower than the best price offered for the selected product by at least one other response; and
  forwarding the plurality of responses to the mobile phone.

35. The method of claim 34 wherein the directing the mobile phone to derive the product information includes capturing and analyzing video images of the selected product to determine the product information, the video images including a barcode located on the selected product.

36. The method of claim 34 further comprising:
 directing the mobile phone to display the plurality of responses for selection; and
 directing the mobile phone to complete a purchase transaction with respect to the selected product upon selection one of the plurality of responses.

37. The method of claim 36 further comprising completing the purchase transaction online.

38. The method of claim 34 further comprising:
 incorporating user information in the request; and
 retrieving user profile information based on the user information;
 wherein the pricing research results are generated based on the user profile information.

39. A computer-readable medium having stored thereon computer-executable instructions that when executed by a processor implement the following acts:
 ascertaining a current location of a mobile device independent of user input;
 directing the mobile device to issue a request for pricing information on a selected product, the request including the current location of the mobile device;
 generating pricing research results on the selected product in response to the request and transmitting the pricing research results to a plurality of merchants offering the product;
 receiving a plurality of responses from the plurality of merchants based on the pricing research results, the plurality of responses include offers for the selected product, wherein at least one of the plurality of responses is generated based on the current location, and wherein at least one of the plurality of responses from a given merchant includes an offer for an alternative product as determined by the given merchant that it is not feasible to offer the selected product at a price lower than that of at least one other response; and
 forwarding the plurality of responses to the mobile device.

40. An apparatus configured to obtain product pricing information, comprising:
 means for ascertaining a current location of a mobile device independent of manual input;
 means for directing the mobile device to derive product information with respect to a selected product;
 means for issuing a request for pricing information on the selected product, the request including the product information and the current location of the mobile device;
 means for receiving offers for the selected product from a plurality of merchants in response to the request;
 means for generating a plurality of responses based on the offers, wherein at least one of the plurality of responses is based on the currently location, and wherein at least one of the plurality of responses from a given merchant includes an offer for an alternative product as determined by the given merchant that it is not feasible to offer the selected product at a price lower than that of at least one other response; and
 means for forwarding the plurality of responses to the mobile device.

* * * * *